(12) United States Patent
Kang et al.

(10) Patent No.: US 11,668,551 B2
(45) Date of Patent: Jun. 6, 2023

(54) MEASURING TAPE WITH FINGER STOP

(71) Applicant: KOMELON CORPORATION, Busan (KR)

(72) Inventors: Dong Hun Kang, Busan (KR); Nam Hoon Kang, Busan (KR); Seok Jun An, Busan (KR); Baek Cheon Shin, Busan (KR)

(73) Assignee: KOMELON CORPORATION, Busan (KR)

( * ) Notice: Subject to any disclaimer, the term of this patent is extended or adjusted under 35 U.S.C. 154(b) by 94 days.

(21) Appl. No.: 17/349,778

(22) Filed: Jun. 16, 2021

(65) Prior Publication Data
US 2021/0396505 A1    Dec. 23, 2021

(30) Foreign Application Priority Data

Jun. 18, 2020  (KR) .......................... 10-2020-0074006

(51) Int. Cl.
| | | |
|---|---|---|
| *G01B 3/1003* | (2020.01) | |
| *G01B 3/1048* | (2020.01) | |
| *G01B 3/102* | (2020.01) | |
| G01B 3/1005 | (2020.01) | |
| G01B 3/1061 | (2020.01) | |

(52) U.S. Cl.
CPC ........... *G01B 3/1003* (2020.01); *G01B 3/102* (2020.01); *G01B 3/1048* (2020.01); *G01B 2003/1033* (2013.01); *G01B 2003/1066* (2013.01)

(58) Field of Classification Search
CPC .. G01B 3/1003; G01B 3/1048; G01B 3/1007; G01B 3/102

USPC .......................................................... 33/767
See application file for complete search history.

(56) References Cited

U.S. PATENT DOCUMENTS

| | | | | |
|---|---|---|---|---|
| 5,395,069 A | * | 3/1995 | Chen .................... | G01B 3/1005 242/381.3 |
| 5,657,551 A | * | 8/1997 | Lin ....................... | G01B 3/1005 242/381.3 |
| 5,791,581 A | * | 8/1998 | Loeffler ................. | B65H 75/44 242/380 |
| 6,085,433 A | * | 7/2000 | Li ......................... | G01B 3/1005 242/381.3 |
| 6,161,299 A | * | 12/2000 | Lin ...................... | G01B 3/1005 33/767 |

(Continued)

FOREIGN PATENT DOCUMENTS

GB           2310195 A  *   8/1997  .......... G01B 3/1005

*Primary Examiner* — Christopher W Fulton
(74) *Attorney, Agent, or Firm* — Kunzler Bean & Adamson (57) ABSTRACT

Disclosed is a measuring tape which comprises a housing, a reel received in the housing, and a blade wound on an outer surface of the reel and withdrawn or restored from an entrance of the housing, the measuring tape comprising: a finger recess formed through a bottom surface of the housing to expose a bottom surface of the blade; and a brake including a slide button exposed to the upper portion of the entrance, a brake plate slidely moving inside the housing depending on the movement of the slide button, and a brake port formed at an end of the brake plate to selectively press the upper surface of the blade, wherein the brake pork is positioned on the upper portion of the finger recess in a released state, and presses the upper surface of the blade by moving to the rear side of the finger recess in a locked state.

8 Claims, 7 Drawing Sheets

(56) References Cited

U.S. PATENT DOCUMENTS

| | | | |
|---|---|---|---|
| 6,167,635 B1 * | 1/2001 | Lin | G01B 3/1005 33/767 |
| 6,249,986 B1 * | 6/2001 | Murray | G01B 3/10 33/771 |
| 6,256,901 B1 * | 7/2001 | Lin | G01B 3/1005 33/767 |
| 6,470,590 B1 * | 10/2002 | Lee | G01B 3/1005 33/767 |
| 7,174,656 B1 * | 2/2007 | Smith | G01B 3/1084 33/769 |
| 8,806,770 B2 | 8/2014 | Steele et al. | |
| 8,898,922 B2 | 12/2014 | Bridges et al. | |
| 2004/0035017 A1 * | 2/2004 | Yang | B65H 75/4431 33/767 |
| 2007/0056182 A1 * | 3/2007 | Di Bitonto | G01B 3/1005 33/767 |
| 2017/0292821 A1 * | 10/2017 | De | G01B 3/1005 |

* cited by examiner

MEASURING TAPE WITH FINGER STOP

CROSS-REFERENCE TO RELATED APPLICATIONS

This application claims the priority of Korean Patent Application No. 10-2020-0074006 filed on Jun. 8, 2020, in the Korean Intellectual Property Office, the disclosure of which is incorporated herein by reference.

BACKGROUND OF THE INVENTION

Field of the Invention

The present invention relates to a measuring tape, and more particularly, to a measuring tape with a finger stop capable of controlling a withdrawal distance and a restoring rate of a blade using a finger.

Description of the Related Art

A general measuring tape includes a housing, a reel elastically supported inside the housing, a blade wound on the reel in a coil form, and an end hook coupled to an end of the blade. A user withdraws the blade from an end to which the end hook is coupled for measurement and withdraws the blade by a desired length to measure a length or distance of an object to be measured.

Further, the elastically operating reel includes a clockwork spring and a bobbin receiving the clockwork spring and is provided in a state in which the blade is wound on an outer surface of the bobbin and withdrawn to the housing, and the blade withdrawn by restoration force of the clockwork spring may return in a winding direction on the bobbin.

A brake may be included to maintain a withdrawn state of the blade. In general, the brake includes a button exposed to the outside of the housing, and may temporarily stop the return of the blade or release the stopped blade through an operation of pressing the button.

However, in addition to such a brake type, there is a finger stop type measuring tape using a finger.

In U.S. Pat. No. 8,806,770, there is disclosed a measuring tape equipped with a separate finger guard member in order to prevent a hook from colliding with a finger while returning, wherein a finger is positioned between an entrance formed separately in a housing and a guard member mounted on the front side thereof to control the blade to return by the finger.

However, there is an inconvenience to separately mount the finger guard member, and it is difficult to be easily controlled because the structure is complicated and the blade is stopped only by a surface pressed by the finger.

In U.S. Pat. No. 8,898,922, there is disclosed a measuring tape in which a finger recess is partially formed below a housing and a lock point of a blade is formed close to a front side, that is, an entrance of the finger recess. This measuring tape enables finger-braking, but since only a part of a bottom surface of the blade is exposed at a small width by the finger recess, a sufficient drag force cannot be supplied.

The above-described technical configuration is a background technique for assisting the understanding of the present invention, and does not mean a conventional technology widely known in the art to which the present invention belongs.

SUMMARY OF THE INVENTION

An object of the present invention is to provide a measuring tape with a finger stop having a simple structure without additional elements so as to solve the problems of conventional finger stop type measuring tapes.

Another object of the present invention is to provide a measuring tape with a finger stop capable of supplying a drag force of the finger stop to upper and lower surfaces of a blade by forming an opposite support structure at a point pressing a finger.

Yet another object of the present invention is to provide a measuring tape with a finger stop capable of supplying a sufficient drag force entirely so that the bottom surface of the blade is fully exposed by controlling the blade using a finger recess.

Still another object of the present invention is to provide a measuring tape with a finger stop capable of considering a left hand use of a right-handed user and a right hand use of a left-handed user by considering a use of both hands.

Still yet another object of the present invention is to provide a measuring tape with a finger stop capable of enabling an interaction between a slide-type general brake and a finger-stop brake and improving an operation by a slide brake.

According to an exemplary embodiment of the present invention to achieve the objects of the present invention, a measuring tape which comprises a housing, a reel received in the housing, and a blade wound on an outer surface of the reel and withdrawn or restored from an entrance of the housing, the measuring tape comprises: a finger recess formed through a bottom surface of the housing to expose a bottom surface of the blade; and a brake including a slide button exposed to the upper portion of the entrance, a brake plate slidely moving inside the housing depending on the movement of the slide button, and a brake fork formed at an end of the brake plate to selectively press the upper surface of the blade, wherein the brake fork is positioned on the upper portion of the finger recess in a released state, and presses the upper surface of the blade by moving to the rear side of the finger recess in a locked state.

A first case and a second case may be included to form the housing, wherein guide protrusions may be formed at left and right ends in the first case and the second case to guide the movement of the brake plate A first elastic layer may be integrally formed on the outer surface of the first case, and a second elastic layer may be integrally formed on the outer surface of the second case, wherein the first elastic layer and the second elastic layer may extend to the inner surface of the housing from the rear side of the finger recess to form a blade support surface, the brake fork may be first in contact with the upper surface of the blade on the blade support surface while moving in a locked state, and the brake fork may press the blade at the rear end of the blade support surface while passing through the blade support surface by the additional movement of the slide button.

A width of the finger recess may be formed to be larger than a width of the blade to expose the overall width of the blade by the finger recess.

In addition, left and right boundaries of the finger recess may be asymmetrically formed, and the heights of the portions exposed by the finger recess may be different from each other at the left and right sides of the housing. Since a right-handed user may have relatively weak left-handed grip strength, the left side exposed portion of the finger recess is highly formed to form a drag force on a wider surface. On the other hand, since a left-handed user may have relatively weak right-handed grip strength, the right side exposed portion of the right finger recess is relatively highly formed so that the user may further conveniently use the measuring tape when gripping the measuring tape with a right hand.

According to a more detailed example, in the case of a measuring tape for a right-handed user, a left side exposed portion of the finger recess may be formed to be higher than a right side exposed portion thereof. For finger protection, the blade may be maintained in a concavely curved state in the finger recess, and the right side edge of the blade may be positioned to be higher than an adjacent side boundary of the finger recess to prevent the finger from being injured by the side of the blade.

In addition, the left side edge of the blade formed asymmetrically may be exposed by the side exposed portion of the finger recess formed relatively high, wherein a tangent extending in a vertical direction to the central line of the blade from the left side edge of the blade may pass through the housing to prevent the finger from being injured even when the user grips the measuring tape with the left hand.

According to an exemplary embodiment of the present invention to achieve the objects of the present invention, a measuring tape which comprises a housing, a reel received in the housing, and a blade wound on an outer surface of the reel and withdrawn or restored from an entrance of the housing, the measuring tape comprises a finger recess formed through a bottom surface of the housing which is formed in a hollow shape to expose a bottom surface of the blade, wherein a width of the finger recess is formed to be larger than a width of the blade to expose the overall width of the blade by the finger recess.

The blade may be maintained in a concavely curved state in the finger recess and a side edge of the blade may be designed to be positioned to be higher than an adjacent side boundary of the finger recess.

The blade may be maintained in a concavely curved state in the finger recess and a tangent extending in a vertical direction to a central line of the blade from the side edge of the blade may be designed to pass through the housing.

Side left and right boundaries of the finger recess may be asymmetrically formed, and the heights of the portions exposed by the finger recess may be different from each other at the left and right sides of the housing.

According to the measuring tape with the finger stop of the present invention, it is possible to form a simple type finger stop structure by forming a finger recess through a bottom surface of a housing without a need to mount additional elements on the housing.

Further, it is possible to form an opposite support structure by positioning a brake fork at a point pressing a finger and improve a drag force by contacting the upper surface of the finger stop on both sides by the brake fork while pressing the bottom surface of the blade by a finger.

Further, it is possible to supply a sufficient drag force entirely so that the bottom surface of the blade is fully exposed by controlling the blade using a finger recess.

Further, it is possible to consider a left hand use and safety of a right-handed user by considering a use of both hands and consider a right hand use and safety of a user by considering a right hand use of a left-handed user.

Further, it is possible to enable an interaction between a slide-type general brake and a finger-stop brake and improve an operation by a slide brake.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings, but the present invention is not limited or restricted to the embodiments. For reference, in the description, like reference numerals substantially refer to like elements, which may be described by citing contents disclosed in other drawings under such a rule and contents determined to be apparent to those skilled in the art or repeated may be omitted.

Figure 1:
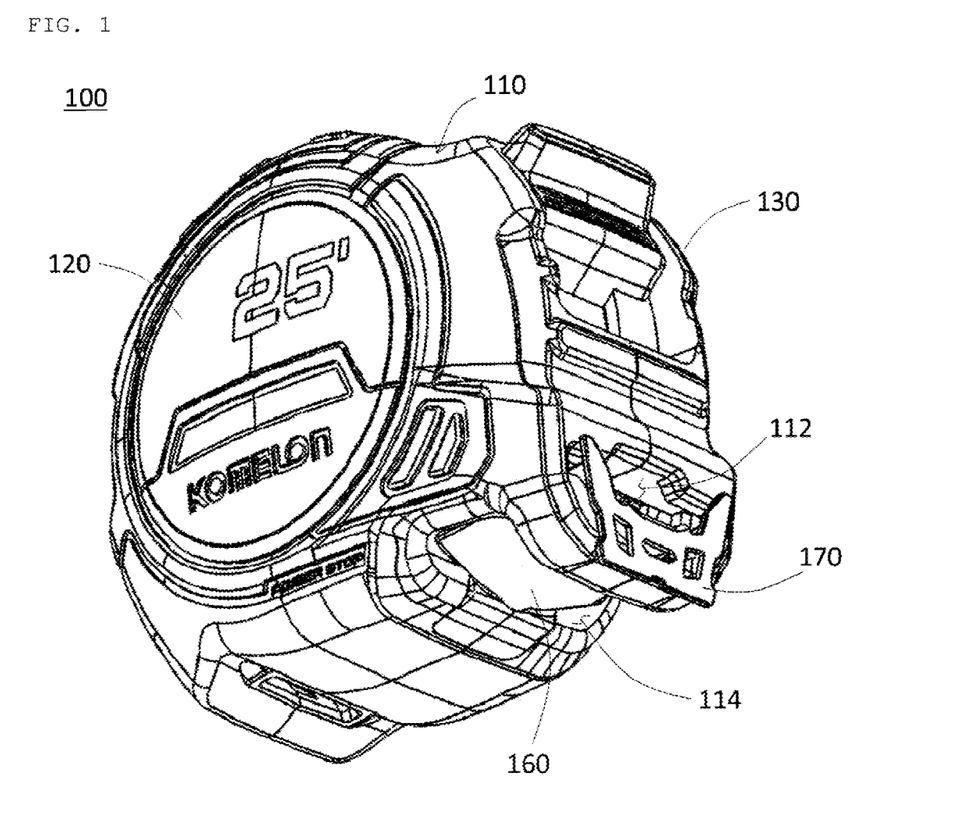
FIG. 1 is a perspective view for describing a measuring tape with a finger stop according to an embodiment of the present invention.
Figure 2:
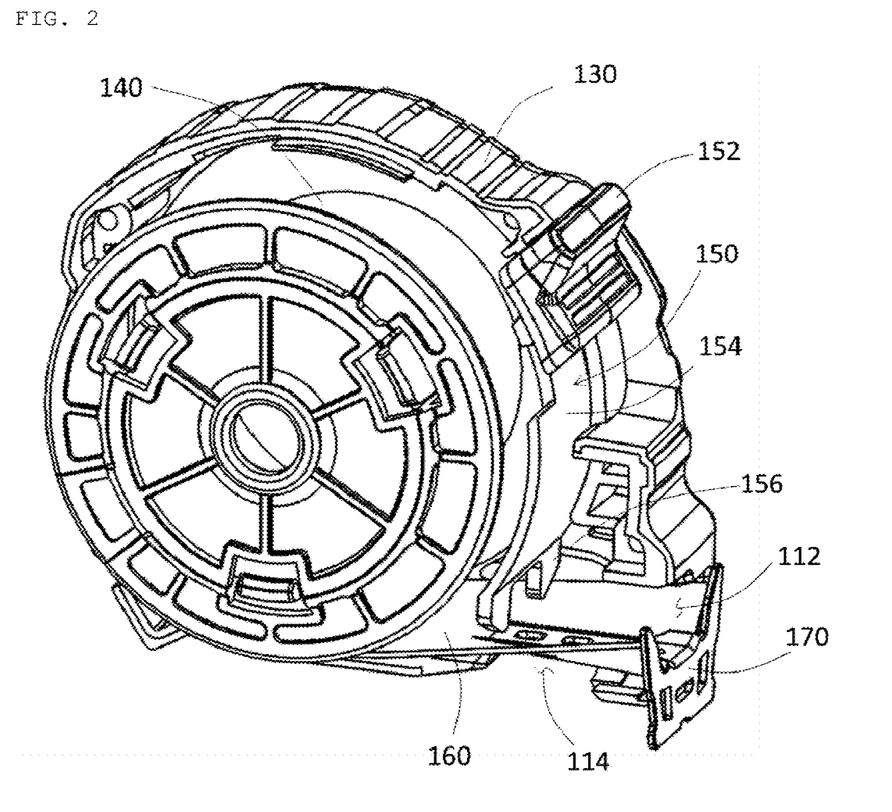
FIG. 2 is a perspective view for describing an internal structure of the measuring tape with the finger stop of FIG. 1.
Figure 3:
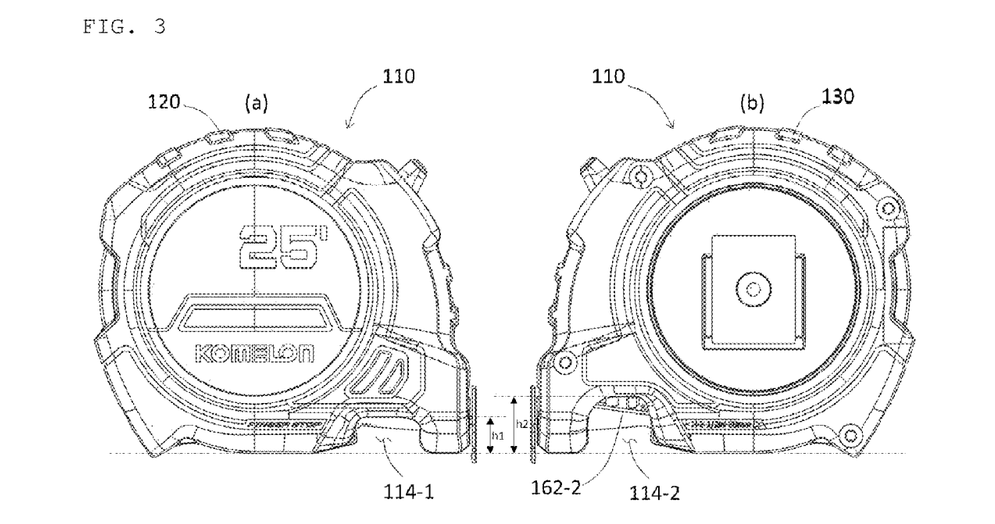
FIGS. 3a and 3b are side views for comparing left and right shapes of the measuring tape with the finger stop of FIG. 1.
Figure 4:
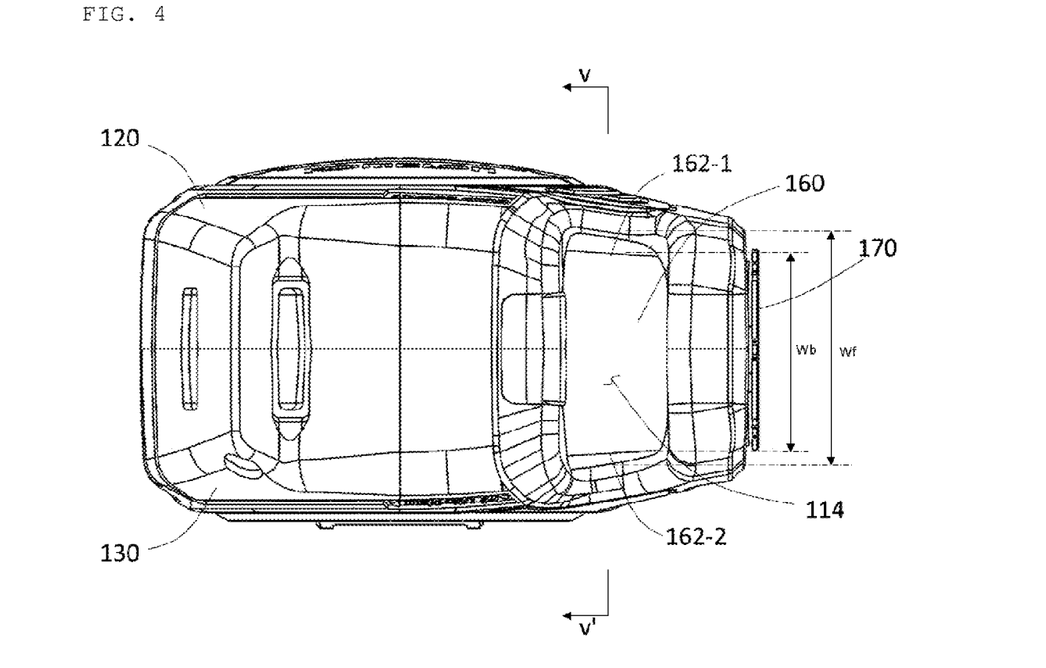
FIG. 4 is a bottom view for describing a finger recess of the measuring tape with the finger stop of FIG. 1.

FIG. 1 is a perspective view for describing a measuring tape with a finger stop according to an embodiment of the present invention, FIG. 2 is a perspective view for describing an internal structure of the measuring tape with the finger stop of FIG. 1, FIGS. 3a and 3b are side views for comparing left and right shapes of the measuring tape with the finger stop of FIG. 1, and FIG. 4 is a bottom view for describing a finger recess of the measuring tape with the finger stop of FIG. 1.

Referring to FIGS. 1 to 4, a measuring tape 100 according to the embodiment includes a housing 110, a reel 140 received in the housing 110, and a blade 160 wound on an outer surface of the reel 140 and withdrawn or restored from an entrance 112 of the housing 110.

The housing 110 is formed by coupling of a first case 120 and a second case 130, the reel 140 is received inside the housing 110 based on a rotation axis connecting the first case 120 and the second case 130 and may include a bobbin on which the blade 160 is wound and a spring received in the bobbin. The bobbin and the spring may refer to a structure of other existing measuring tapes.

For example, the spring may be provided in a clockwork shape, and an inner end thereof is fixed to a rotation axis of the reel 140, and an outer end thereof is fixed to an end of the blade 160. Thus, the spring may continuously provide a force for winding the blade 160, and the blade 160 withdrawn to the outside of the housing 110 may return to the inside through the entrance 112 of the housing to be wound on the outer surface of the reel 140.

The measuring tape 100 may include the blade 160 capable of measuring 3.5 m, 5.5 m, and the like, depending on a measurable maximum length, and may be provided in various types depending on a material, a width, or the like of the blade 160. Further, a hook 170 may be mounted on the end of the blade 160.

According to the embodiment, a finger recess 114 may be formed on a bottom surface of the housing 110. The finger recess 114 may be formed through the bottom surface of the housing 110, and may be formed by fitting recess grooves formed at lower portions of the first case 120 and the second case 130 to each other. Since the housing 110 is formed in a hollow shape, the inside of the housing 110 needs to be exposed by the finger recess 114, but since the blade 160 passes through an inner bottom of the housing 110, the bottom surface of the blade 160 may be substantially exposed to the outside through the finger recess 114.

In addition, the measuring tape 100 may include a brake 150 for temporarily fixing the blade 160. The brake 150 may include a slide button 152 exposed to the upper portion of the entrance 112, a brake plate 154 slidely moving inside the housing 110 depending on the movement of the slide button 152, and a brake fork 156 formed at an end of the brake plate 154 to selectively press the upper surface of the blade 160.

The brake fork 156 may be designed to be positioned on the upper portion of the finger recess 114 while the brake 150 is released, that is, in a released state, and designed to press the upper surface of the blade 160 by moving to the rear side of the finger recess 114 in a locked state.

Referring to FIG. 4, a width Wf of the finger recess 114 may be formed to be larger than a width Wb of the blade 160, and on the bottom surface of the housing 110, both a first side edge 162-1 and a second side edge 162-2 of the blade 160 may be seen through the finger recess 114.

Accordingly, the bottom surface of the blade 160 may be exposed by the finger recess 114 with the entire width, and the user may further stably stop the blade 160 by pressing the bottom surface of the blade 160 exposed entirely on the left and right sides. For reference, in the related art, for finger protection, since only a central portion of the bottom surface of the blade is exposed, there is a problem that the user needs to press the blade more than needs, but the measuring tape according to the embodiment may solve this problem.

Further, side left and right boundaries of the finger recess 114 may be asymmetrically formed, and the heights of the portions exposed by the finger recess 114 may be different from each other on the left and right sides of the housing 110.

Since a right-handed user may have relatively weak left-handed grip strength, the left side exposed portion of the finger recess is highly formed to form a drag force on a wider surface. On the other hand, since a left-handed user may have relatively weak right-handed grip strength, the right side exposed portion of the right finger recess is relatively highly formed so that the user may further conveniently use the measuring tape when gripping the measuring tape with a right hand.

Referring to FIG. 3, it is assumed that the measuring tape 100 according to the embodiment is used by the right-handed user, and when the right-handed user grips the measuring tape with the right hand, a height h1 of a portion 114-1 exposed by the finger recess 114 in the first case 120 in contact with a palm is relatively lower than a height h2 of a portion 114-2 exposed by the finger recess 114 in the second case 130 opposite thereto.

Accordingly, the first side edge of the blade 160 is not seen through the portion 114-1 exposed by the finger recess 114 in the first case 120 side, but the second side edge 162-2 of the blade 160 may be seen through the portion 114-2 exposed by the finger recess 114 in the second case 130 side.

Figure 5:
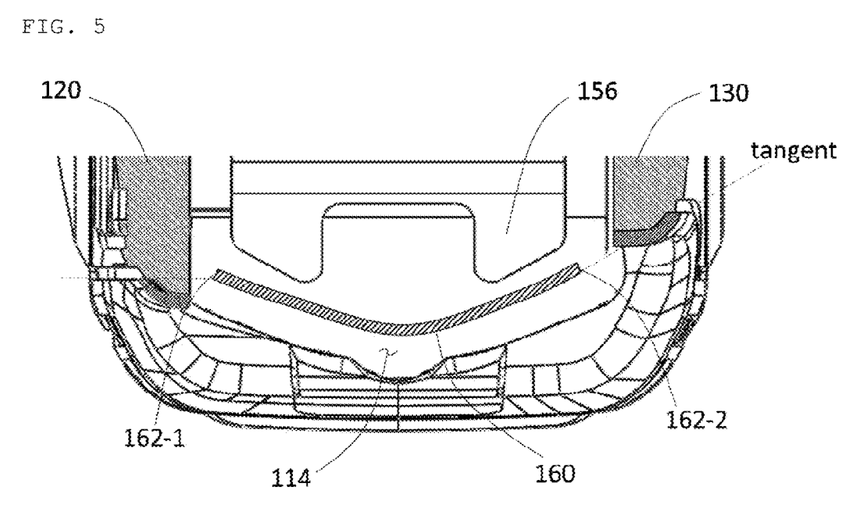
FIG. 5 is a partially enlarged cross-sectional view for describing an internal structure viewed in a V-V' direction in FIG. 4 in the measuring tape with the finger stop according to an embodiment of the present invention.

FIG. 5 is a partially enlarged cross-sectional view for describing an internal structure viewed in a V-V' direction in FIG. 4 in the measuring tape with the finger stop according to an embodiment of the present invention.

Referring to FIG. 5, for finger protection, the blade 160 may be maintained in a concavely curved state in the finger recess 114, and the right side edge 162-1 of the blade 160 is positioned higher than an adjacent side boundary of the finger recess 114 to prevent the right hand or the finger thereof from being injured by the side of the blade 160.

Further, the left side edge 162-2 of the blade 160 formed asymmetrically may be exposed to be seen from the side by the side exposed portion of the finger recess 114 formed relatively high. Here, a tangent extending in a vertical direction to a central line of the blade 160 from the second side edge 162-2 of the blade 160 may be designed to pass through the housing 110. Accordingly, even when the user grips the measuring tape with the left hand, the finger is entirely bent to press the bottom surface of the blade 160 to prevent the second side edge 162-2 from being in direct contact with the finger.

Further, as illustrated in the drawings, when the brake fork 156 is positioned directly on the blade 160 and the user presses the bottom surface of the blade 160 with the finger, on the upper surface of the blade 160, the brake fork 156 may be in contact with the upper surface of the blade 160 to stop the blade 160 on both sides.

Figure 6:
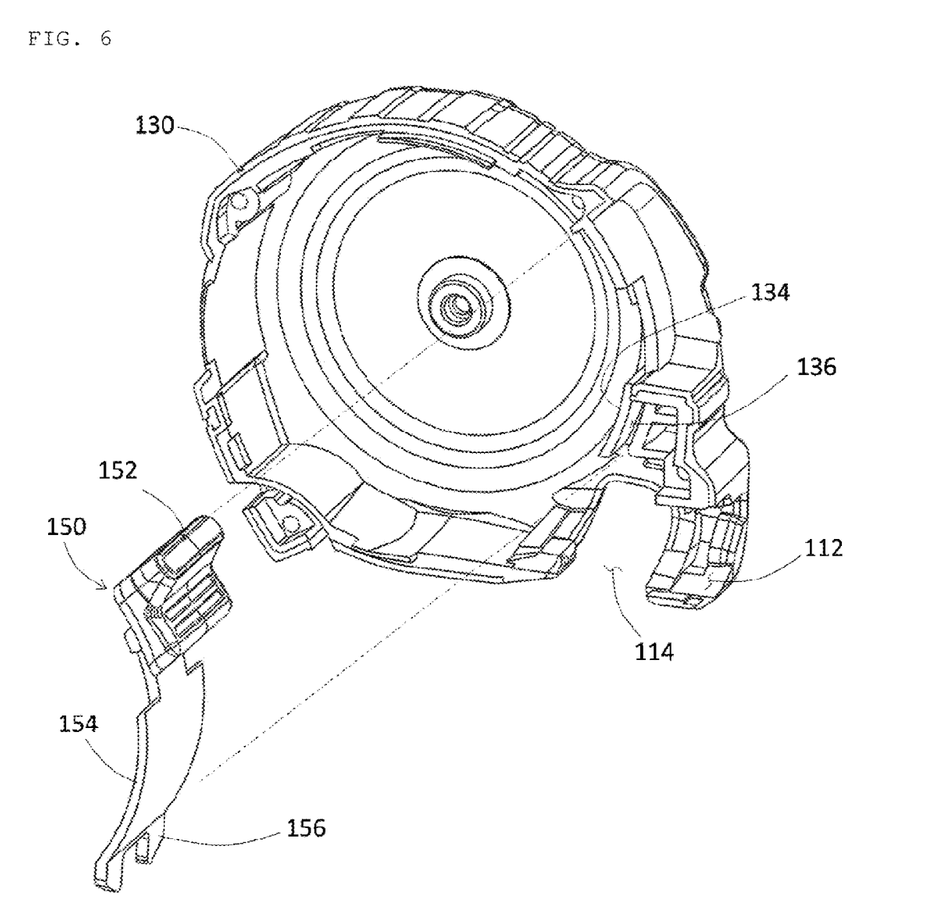
FIG. 6 is an exploded view of a second case and a brake for describing the internal structure of the measuring tape with the finger stop according to an embodiment of the present invention.

FIG. 6 is an exploded view of a second case and a brake for describing the internal structure of the measuring tape with the finger stop according to an embodiment of the present invention.

Referring to FIG. 6, the inside of the housing 110 is formed in a hollow shape, and in order to minimize a space occupied due to component formation, guide protrusions 134 for guiding the movement of the brake plate 154 may be formed at left and right ends in the first case and the second case 130.

The guide protrusions 134 may receive only the left and right sides of the brake plate 154 and formed to be lower than an outer wall of the second case 130 to efficiently maintain an installation space of the brake 150 inside the housing 110. A rail 136 for guiding the slide movement of the brake plate 154 by the guide protrusion 134 may be formed on the second case 130.

Although not illustrated in FIG. 6, a guide protrusion and a rail having similar structures may be formed even in the first case 120.

Figure 7:
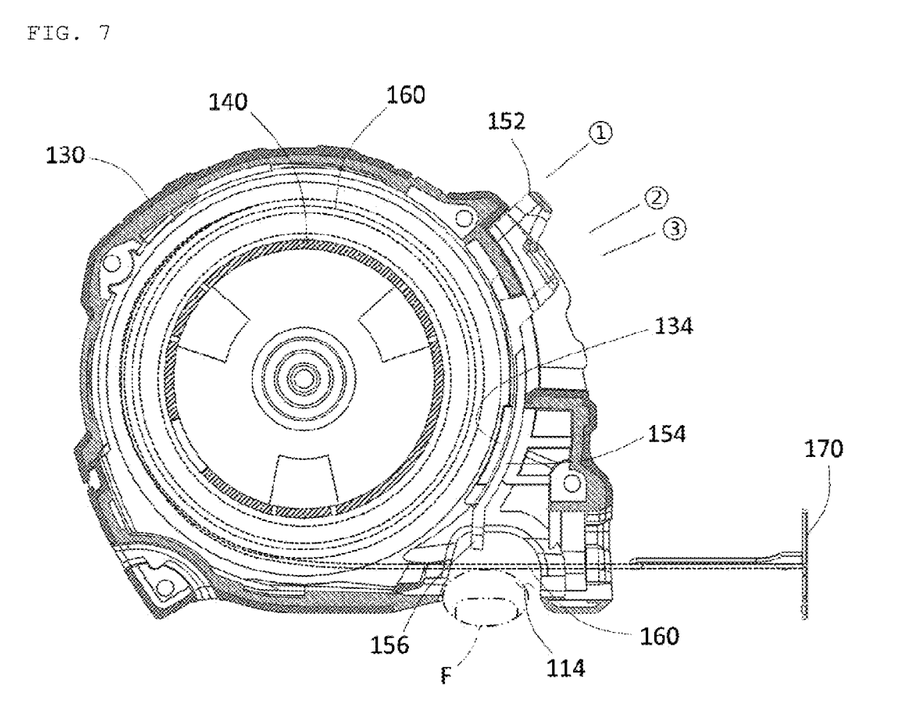
FIG. 7 is a cross-sectional view for describing a finger stop function of the measuring tape with the finger stop according to an embodiment of the present invention.

FIG. 7 is a cross-sectional view for describing a finger stop function of the measuring tape with the finger stop according to an embodiment of the present invention and FIGS. 8a and 8b are cross-sectional views for describing a stop function by a brake in the measuring tape with the finger stop of FIG. 7.

Referring to FIG. 7, the brake fork 156 is positioned on the finger recess 114 in a state in which a slide button 152 of the brake 150 is in a release position ①. Accordingly, if the user supports and lifts the bottom surface of the blade 160 with a finger F, the upper and lower surfaces of the blade 160 may be blocked by the brake fork 156 and the finger F, respectively, and the user may stably stop temporarily the blade 160 by using a relatively small force.

Since the blade 160 is wound on the outer surface of the reel 140, and the reel 140 tends to rotate in a clockwise direction, when the finger F is released, the blade 160 may be moved in the winding direction.

Figure 8:
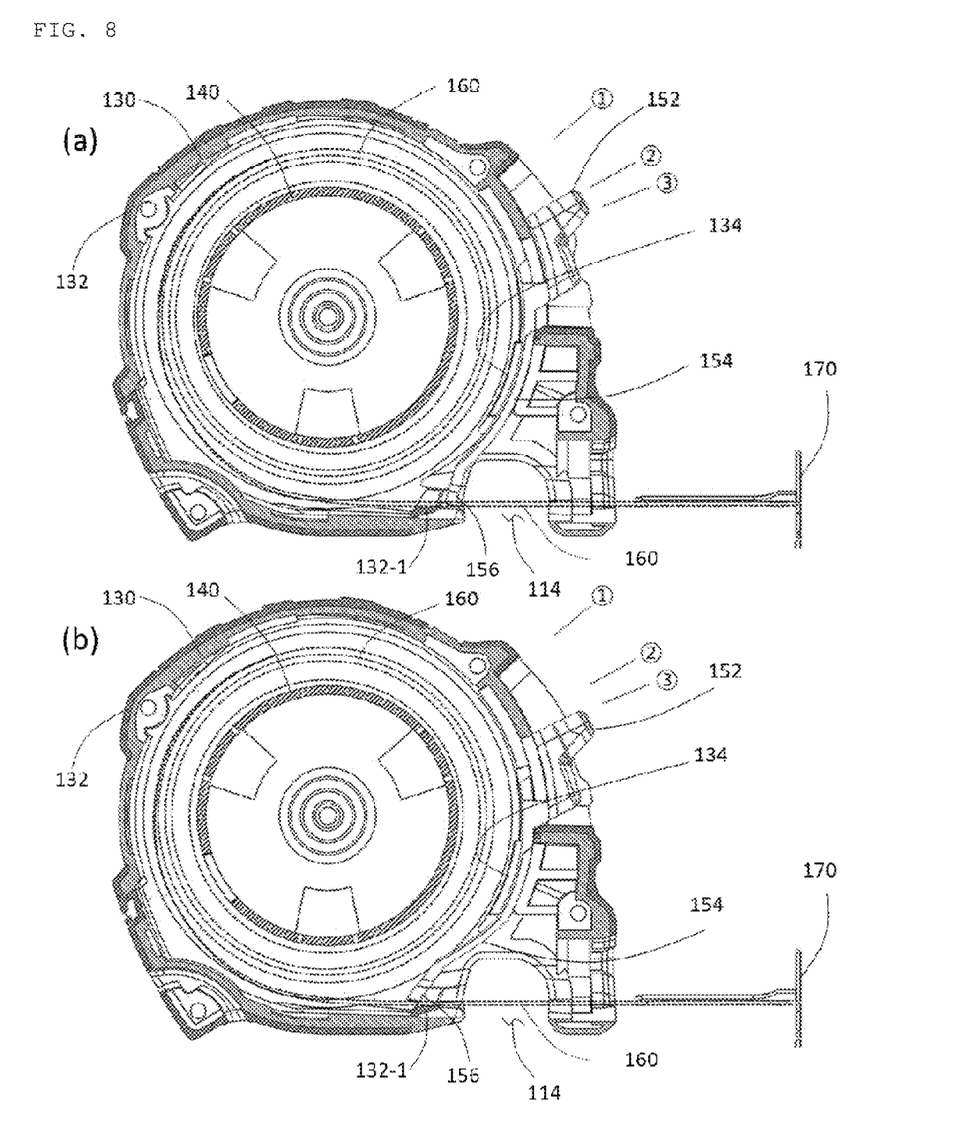
FIGS. 8a and 8b are cross-sectional views for describing a stop function by a brake in the measuring tape with the finger stop of FIG. 7.

Referring to FIG. 8, a second elastic layer 132 made of a rubber material may be formed on the outer surface of the second case 130, and may be formed by double injection or compression molding. Although not illustrated, a first elastic layer may be formed even on the outer surface of the first case 120. The first elastic layer and the second elastic layer 132 may protect the surface of the case from the outside and absorb the impact that is applied from the ground even if the measuring tape falls down, and prevent the case from sliding from a user's hand.

Further, in the embodiment, the first elastic layer and the second elastic layer 132 extend to the inner surface of the housing 110 from the rear side of the finger recess 114 to form a blade support surface 132-1.

Accordingly, while the slide button 152 of the brake 150 moves in a locked state, the brake fork 156 in a middle position ② may be first in contact with the upper surface of the blade 160 near the blade support surface 132-1 (a).

When the user moves the slide button 152 up to a locking position ③ which is the bottom by further lowering the slide button 152, the brake fork 156 passes through the blade support surface 132-1 while the brake plate 154 is partially bent by the additional movement of the slide button 152 and the brake fork 156 may firmly press the blade 160 at the rear end of the blade support surface 132-1.

In this process, the blade support surface 132-1 made of the rubber material may increase the contact resistance with the blade 160, and the brake fork 156 may easily pass through the upper surface of the blade 160.

In addition, the blade 160 may be bent in a S shape by the brake fork 156 at the rear end of the blade support surface 132-1 to more firmly maintain the stop state.

As described above, the present invention has been described with reference to the preferred embodiments thereof, but it will be appreciated by those skilled in the art that various modifications and changes of the present invention can be made without departing from the spirit and the scope of the present invention which are defined in the appended claims.

What is claimed is:

1. A measuring tape which comprises a housing, a reel received in the housing, and a blade wound on an outer surface of the reel and withdrawn or restored from an entrance of the housing, the measuring tape comprising:
   a finger recess formed through a bottom surface of the housing to expose a bottom surface of the blade; and
   a brake including a slide button exposed to the upper portion of the entrance, a brake plate slidely moving inside the housing depending on the movement of the slide button, and a brake fork formed at an end of the brake plate to selectively press the upper surface of the blade,
   wherein the brake fork is positioned on the upper portion of the finger recess in a released state, and presses the upper surface of the blade by moving to the rear side of the finger recess in a locked state, and
   wherein side left and right boundaries of the finger recess are asymmetrically formed, and the heights of the portions exposed by the finger recess are different from each other at the left and right sides of the housing.

2. The measuring tape of claim 1, wherein a first case and a second case are included to form the housing, wherein guide protrusions are formed at left and right ends in the first case and the second case to guide the movement of the brake plate.

3. The measuring tape of claim 2, wherein a first elastic layer is integrally formed on the outer surface of the first case, and a second elastic layer is integrally formed on the outer surface of the second case, wherein the first elastic layer and the second elastic layer extend to the inner surface of the housing from the rear side of the finger recess to form a blade support surface, the brake fork is first in contact with the upper surface of the blade on the blade support surface while moving in a locked state, and the brake fork presses the blade at the rear end of the blade support surface while passing through the blade support surface by the additional movement of the slide button.

4. The measuring tape of claim 1, wherein a width of the finger recess is formed to be larger than a width of the blade to expose the overall width of the blade by the finger recess.

5. A measuring tape which comprises a housing, a reel received in the housing, and a blade wound on an outer surface of the reel and withdrawn or restored from an entrance of the housing, the measuring tape comprising:
   a finger recess formed through a bottom surface of the housing which is formed in a hollow shape to expose a bottom surface of the blade,
   wherein a width of the finger recess is formed to be larger than a width of the blade to expose the overall width of the blade by the finger recess, and
   wherein side left and right boundaries of the finger recess are asymmetrically formed, and the heights of the portions exposed by the finger recess are different from each other at the left and right sides of the housing.

6. The measuring tape of claim 5, wherein the blade is maintained in a concavely curved state in the finger recess and a side edge of the blade is positioned to be higher than an adjacent side boundary of the finger recess.

7. The measuring tape of claim 5, wherein the blade is maintained in a concavely curved state in the finger recess and a tangent extending in a vertical direction to a central line of the blade from the side edge of the blade passes through the housing.

8. A measuring tape which comprises a housing, a reel received in the housing, and a blade wound on an outer surface of the reel and withdrawn or restored from an entrance of the housing, the measuring tape comprising:
   a finger recess formed through a bottom surface of the housing to expose a bottom surface of the blade; and
   a brake including a slide button exposed to the upper portion of the entrance, a brake plate slidely moving inside the housing depending on the movement of the slide button, and a brake fork formed at an end of the brake plate to selectively press the upper surface of the blade,
   wherein the brake fork is positioned on the upper portion of the finger recess in a released state, and presses the upper surface of the blade by moving to the rear side of the finger recess in a locked state,
   wherein a first case and a second case are included to form the housing,
   wherein guide protrusions are formed at left and right ends in the first case and the second case to guide the movement of the brake plate,
   wherein a first elastic layer is integrally formed on the outer surface of the first case, and a second elastic layer is integrally formed on the outer surface of the second case, and wherein the first elastic layer and the second elastic layer extend to the inner surface of the housing from the rear side of the finger recess to form a blade support surface, the brake fork is first in contact with the upper surface of the blade on the blade support surface while moving in a locked state, and the brake fork presses the blade at the rear end of the blade support surface while passing through the blade support surface by the additional movement of the slide button.

* * * * *